United States Patent [19]

Hsieh

[11] Patent Number: 5,065,847
[45] Date of Patent: Nov. 19, 1991

[54] BRIEFCASE FORMED WITH THERMOFORMED LAMINATE SHELLS

[76] Inventor: Dick M. Hsieh, No. 18, Lane 777, Chung Shan Rd., Kuei Jen Hsiang, Tainan Hsien, Taiwan

[21] Appl. No.: 676,746

[22] Filed: Mar. 28, 1991

Related U.S. Application Data

[63] Continuation of Ser. No. 514,873, Apr. 26, 1990, abandoned.

[51] Int. Cl.⁵ .................. A45C 3/00; A45C 13/00; A45C 5/02
[52] U.S. Cl. .................... 190/125; 190/40; 190/900; 190/122
[58] Field of Search .............. 190/40, 124, 125, 115, 190/900, 122; 383/116, 110; 150/129, 127; 206/524, 524.2, 523; 428/193, 309.9, 310.5

[56] References Cited

U.S. PATENT DOCUMENTS

| | | | |
|---|---|---|---|
| 2,782,889 | 2/1957 | Eber | 190/40 X |
| 3,542,171 | 11/1970 | Kaplan | 190/115 |
| 3,948,436 | 4/1976 | Bambara | 383/116 X |
| 4,649,974 | 3/1987 | Takanashi | 150/129 X |
| 4,805,776 | 2/1989 | Namgyal et al. | 206/523 |
| 4,817,769 | 4/1989 | Saliba | 190/124 X |

FOREIGN PATENT DOCUMENTS

| | | | |
|---|---|---|---|
| 772981 | 12/1967 | Canada | 190/115 |
| 305207 | 3/1989 | European Pat. Off. | 190/107 |
| 2825325 | 12/1979 | Fed. Rep. of Germany | 190/127 |
| 147812 | 4/1981 | Fed. Rep. of Germany | 383/116 |
| 3246510 | 6/1984 | Fed. Rep. of Germany | 190/124 |
| 2256738 | 8/1975 | France | 190/115 |
| 2508288 | 12/1982 | France | 190/125 |
| 1320716 | 6/1973 | United Kingdom | |
| 1376198 | 12/1974 | United Kingdom | 190/124 |

*Primary Examiner*—Sue A. Weaver
*Attorney, Agent, or Firm*—Webb, Burden, Ziesenheim & Webb

[57] ABSTRACT

A briefcase includes two casing halves which are hinged to one another to allow movement between a closed position and an open position, a pair of briefcase frames respectively attached to one of the casing halves, a handle piece attached to one of the briefcase frames, and a lock incorporated in the briefcase frames. Each of the casing halves is made of a laminate which inlcudes an inner layer made of a soft lining fabric, a center layer made of an elastic plastic foam, and an outer layer made of a strong fabric cloth.

2 Claims, 5 Drawing Sheets

BRIEFCASE FORMED WITH THERMOFORMED LAMINATE SHELLS

BACKGROUND OF THE INVENTION

The invention relates to a briefcase, more particularly to a briefcase which has elastic properties and tensile strength.

Referring to FIGS. 1 and 2, a conventional briefcase is shown to comprise a pair of casing halves A and a first and a second briefcase frame B, C. The casing halves A are usually made of Acrylonitrile-butadiene-styrene (A.B.S.) and are shaped as shallow rectangular pans with a protruding looped lip A1 formed on a peripheral edge. Each of the first and second briefcase frames B, C has an engaging groove for press-fitting with the looped lip A1 of one of the casing halves A. A pair of sheet members are attached to the rear ends of the first and second briefcase frames B, C to hinge the two briefcase frames B, C together. The briefcase further includes a handle piece B2 and locking means B3, B4 for holding the casing halves A in a closed position.

When manufacturing the conventional briefcase in FIGS. 1 and 2, an A.B.S. plate is first cut to the desired dimensions and then undergoes a thermal forming process to shape the casing halves A and the protruding lips A1. The first and second briefcase frames, B and C, are then press-fitted against the casing halves A and a pair of sheet members are attached to the rear of the briefcase frames B and C to hinge the briefcase frames B and C together.

The disadvantages of using an A.B.S. briefcase are as follows:

(a) The A.B.S. briefcase is easily deformed and suffers from scratches, cracks and dents when accidentally bumped into another object.

(b) The A.B.S. briefcase is easily affected by temperature conditions. Extremely high or low temperatures change the characteristics of the briefcase and cause the same to become brittle.

(c) Because of the rigid characteristics of the A.B.S. briefcase, the manufacturing process is too noisy.

Conventional briefcases may also be made of flexible plastic materials, such as synthetic leather, to overcome most of the above mentioned disadvantages. However, production cost of these briefcases is higher and at the same time, production time is longer because sewing machines are used to assemble the briefcases.

SUMMARY OF THE INVENTION

Therefore, the object of this invention is to provide a briefcase which is easy to manufacture, does not easily deform, and is not affected by temperature conditions.

Accordingly, the preferred embodiment of a briefcase of this invention mainly comprises two casing halves which are hinged to one another to allow movement between a closed position and an open position, a pair of briefcase frames respectively attached to one of the casing halves, a handle piece attached to one of the briefcase frames, and a lock incorporated in the briefcase frames. Each of the casing halves is made of a laminate which includes an inner layer made of a soft lining fabric, a center layer made of an elastic plastic foam, and an outer layer made of a strong fabric cloth. Each of the casing halves are shaped by a thermal forming process into a shallow pan with a substantially rectangular loop-shaped peripheral top edge. Each of the briefcase frames are formed as a substantially rectangular ring frame with an engaging groove for tightly receiving the peripheral top edge of one of the casing halves.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 3:
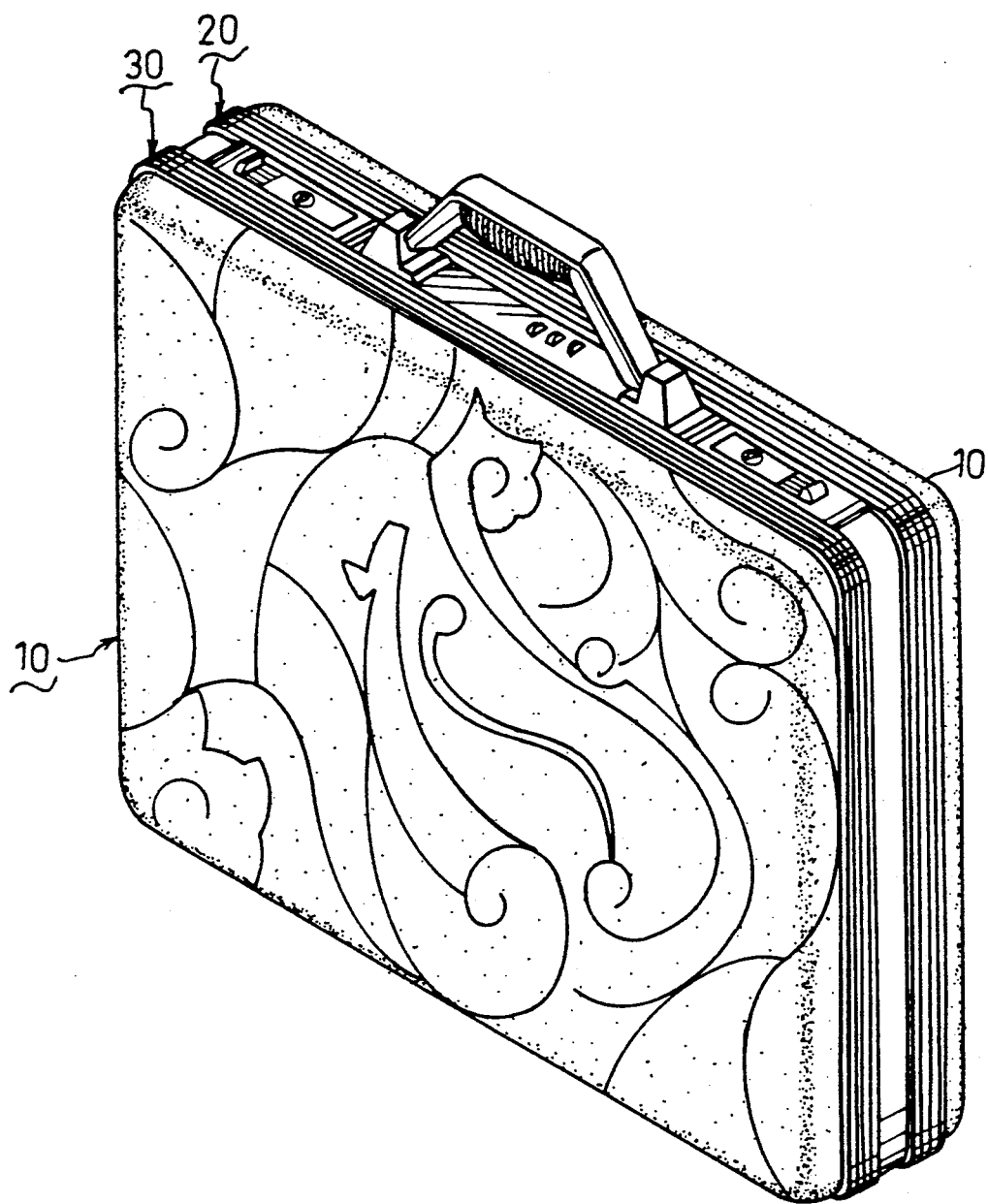
FIG. 3 is an illustration of the preferred embodiment of a briefcase according to this invention.

Referring to FIG. 3, the preferred embodiment of a briefcase according to this invention is shown to comprise a pair of casing halves 10, and a first and a second briefcase frame 20 and 30.

Figure 1:
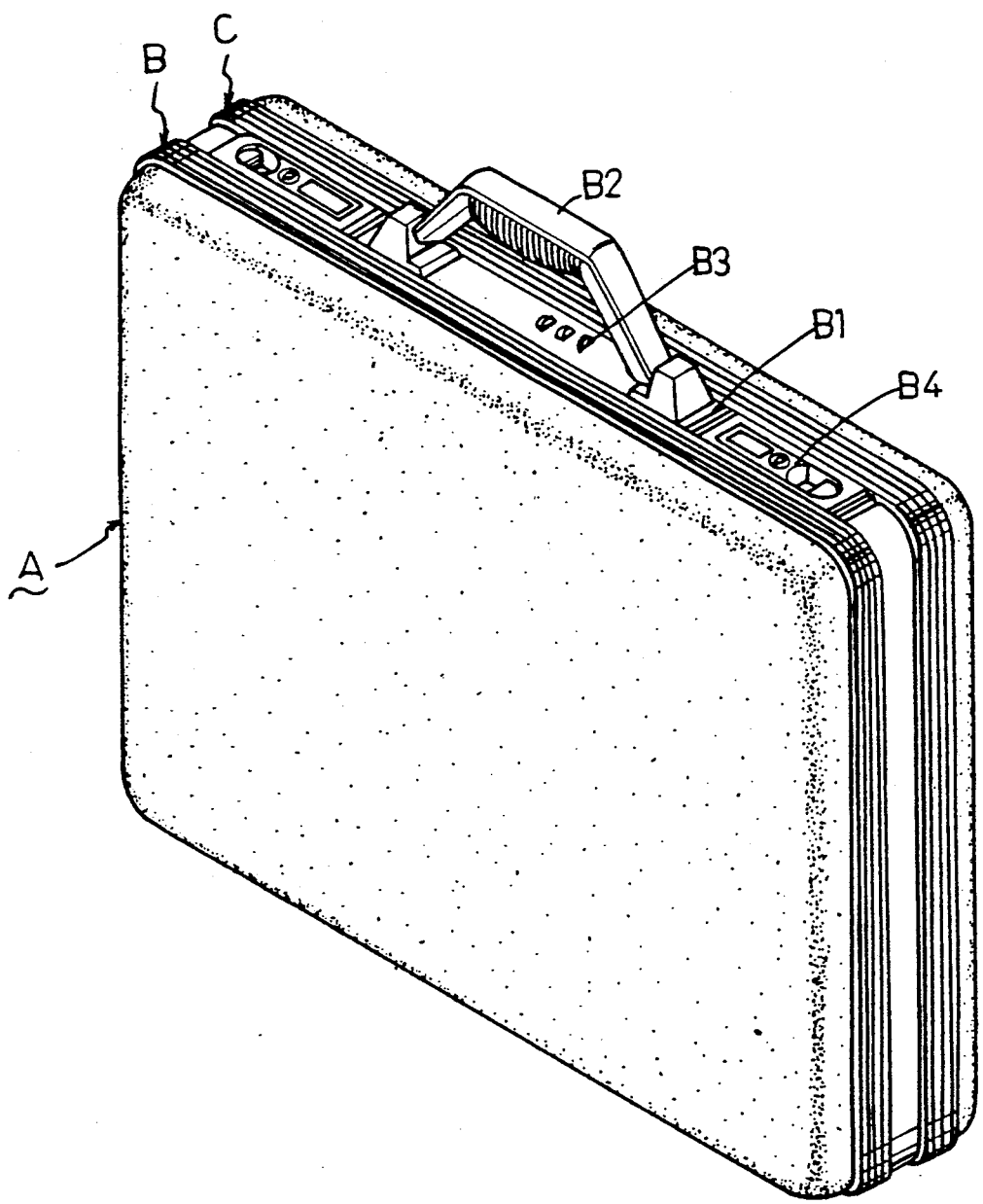
FIG. 1 is an illustration of a conventional briefcase.
Figure 2:
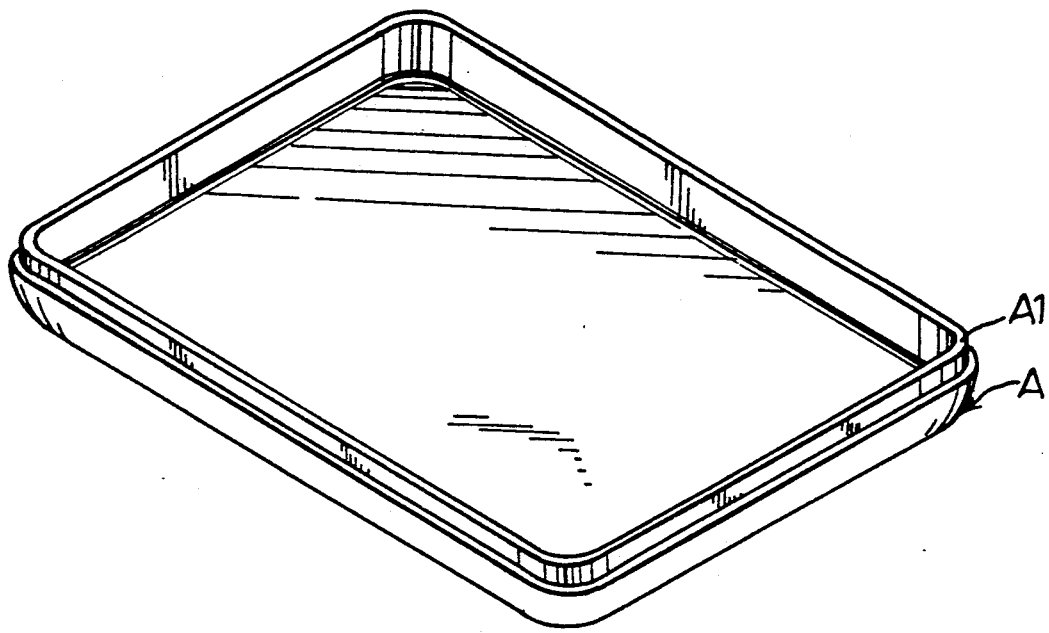
FIG. 2 is an illustration of a casing half of the conventional briefcase in FIG. 1.
Figure 5:
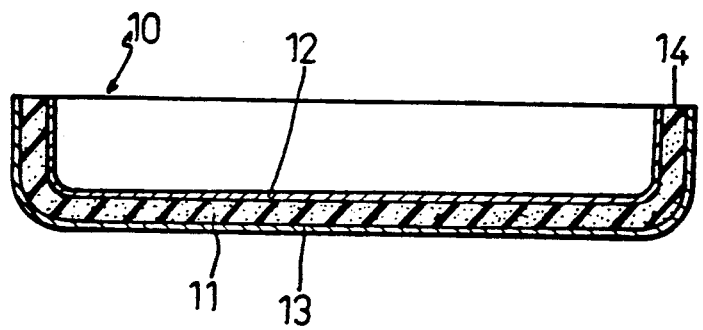
FIG. 5 is a sectional view of a casing half of the briefcase of this invention.

Referring to FIG. 5, each casing half 10 comprises three layers. The center layer 11 is made of ethylene vinyl acetate copolymers (E.V.A.) formed into a plastic foam material to give the briefcase durable and elastic properties. However, other plastic foams may be used instead of the E.V.A. foam. The inner layer 12 is made of a soft lining fabric such as felt. The outer layer 13 is made of a strong fabric such as linen or synthetic fabrics. The outer layer 13 may be made of a fabric with patterns for aesthetic effect. When assembled, the three layers 11, 12, 13 form a laminated body fashioned as a shallow pan by a thermal forming process with a peripheral top edge 14 shaped as a substantially rectangular loop.

Figure 4:
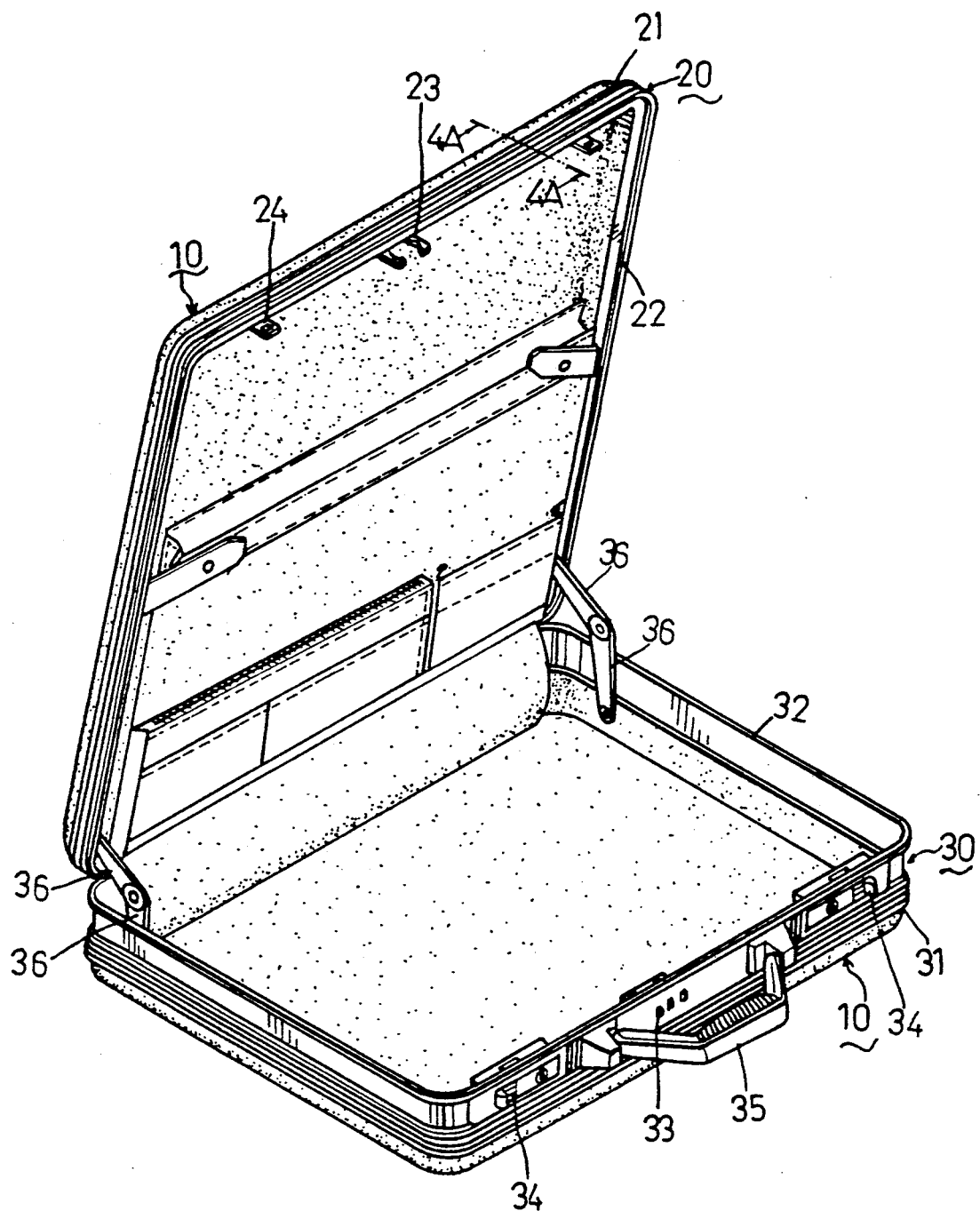
FIG. 4 is a perspective view of the briefcase of FIG. 3 when in a normally upright position.
Figure 4A:
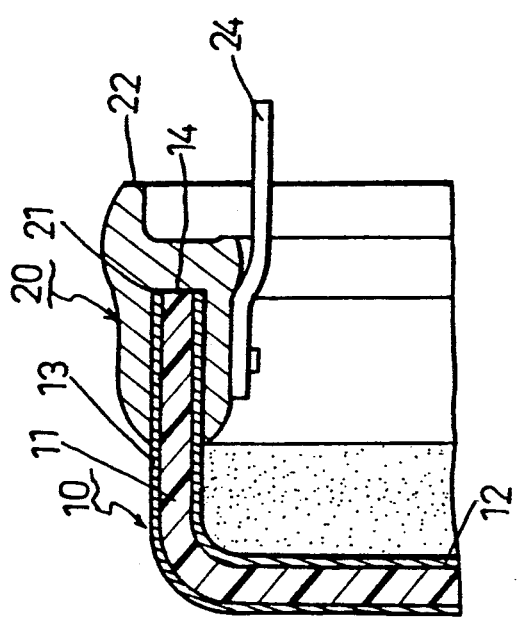
FIG. 4A is a fragmentary sectional view of the briefcase of FIG. 4.

Referring to FIGS. 4 and 4A, the first briefcase frame 20 is a substantially rectangular ring frame with an engaging groove 21 for tightly receiving the peripheral top edge 14 of one of the casing halves 10. The peripheral edge of the first briefcase frame 20 has a looped protruding lip 22. A first latch 23 and a pair of second latches 24 outwardly project from an inner surface of the protruding lip 22.

The second briefcase frame 30 is similarly formed as a substantially rectangular ring frame with an engaging groove 31 for tightly receiving the peripheral top edge 14 of the other casing half 10. The second briefcase frame 30 further includes a lip edge 32 which engages with the protruding lip 22 of the first briefcase frame 20 when the first briefcase frame 20 is in a closed position. The second briefcase frame 30 also includes a combination lock 33 and a pair of lock members 34 which cooperate with the first and second latches 23, 24, and a handle piece 35 installed in a central portion of a front face of the second briefcase frame 30. Two pairs of pivoted links 36 are attached to the first and second briefcase frames 20, 30 at two sides of the briefcase to hold one of the casing halves 10 in a normally upright position. As in conventional briefcases, sheet members (not shown) are attached to a rear face of the casing halves 10 so as to hinge them together.

The steps involved in the manufacturing process of a briefcase according to this invention are as follows:

(1) An E.V.A. plastic foam material is cut to the desired dimensions.

(2) Adhesive is applied to two sides of the cut piece of E.V.A. foam material. The soft lining fabric is adhered to one side of the foam piece, while the strong fabric is adhered to the other side of the foam piece.

(3) The laminate output of the second step is shaped by a thermal forming process into a substantially shallow pan with peripheral top edge 14 fashioned as a substantially rectangular loop to form a casing half 10.

(4) The first and second briefcase frames 20, 30 are attached to one pair of casing halves 10. The engaging groove 21, 31 of each briefcase frame 20, 30 is pressfitted to the peripheral top edge 14 of the casing half 10 and is fastened thereat.

The advantages of using a briefcase according to this invention are as follows:

(a) The center layer 11 gives the briefcase elastic properties and tensile strength. The briefcase is not easily deformed and does not suffer cracks and dents.

(b) The outer layer 13 of the briefcase does not suffer scratch marks due to abrasion.

(c) The outer layer 13 can be made of a cloth fabric having printed patterns for aesthetic effect.

(d) The briefcase is not affected by temperature conditions and does not easily break.

(e) The briefcase is light weight and is thus convenient to carry.

(f) Noise generated during the manufacture of the briefcase is reduced.

(g) The elastic properties allow the briefcase to act as a cushion for articles contained therein, protecting them from damage resulting from impact.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A briefcase, comprising two pan shaped casing halves each having a face panel and a peripheral flange, said casing halves being hinged to one another to allow movement between a closed position and an open position, a first and a second briefcase frame respectively attached to each of said casing halves, a handle piece attached to one of said briefcase frames, a lock incorporated in said briefcase frames, said improvement comprising:

each of said casing halves including a pan shaped thermoformed laminate which includes an inner layer of lining fabric, a center layer of plastic EVA foam, and an outer layer of strong fabric cloth, said center layer extending into both said face panel and said peripheral flange and having a thickness sufficient to provide elastic properties and tensile strength to maintain the shape of said casing half.

2. A briefcase, comprising two pan shaped casing halves each having a face panel and a peripheral flange, said casing halves being hinged to one another to allow movement between a closed position and an open position, a first and a second briefcase frame respectively attached to each of said casing halves, a handle piece attached to one of said briefcase frames, a lock incorporated in said briefcase frames, said improvement comprising:

each of said casing halves comprises a pan shaped thermoformed laminate which includes an inner layer of lining fabric, a center layer of plastic foam, and an outer layer of strong fabric cloth, said center layer extending into both said face panel and said peripheral flange, said laminate devoid of a batt layer and devoid of a reinforcing layer.

* * * * *